United States Patent [19]

Chubb

[11] 4,347,891
[45] Sep. 7, 1982

[54] THERMOCHEMICAL ENERGY TRANSPORT PROCESS

[75] Inventor: Talbot A. Chubb, Arlington, Va.

[73] Assignee: The United States of America as represented by the Secretary of the Navy, Washington, D.C.

[21] Appl. No.: 147,412

[22] Filed: May 6, 1980

[51] Int. Cl.³ ............................................. F28D 15/00
[52] U.S. Cl. .................................. 165/1; 165/104.12; 237/81; 518/704
[58] Field of Search ................... 165/1, 2, 104.12, 107, 165/DIG. 17; 237/81; 518/702, 704, 705, 708

[56] References Cited

U.S. PATENT DOCUMENTS

| 3,690,550 | 9/1972 | Hilberath | 518/704 X |
| 3,958,625 | 5/1976 | Wentore, Jr. | 165/DIG. 17 |
| 4,109,701 | 8/1978 | Hilberath et al. | 165/2 X |
| 4,298,694 | 11/1981 | Skov | 518/704 |

Primary Examiner—Leland A. Sebastian
Attorney, Agent, or Firm—Robert F. Beers; William T. Ellis; Daniel R. Zirker

[57] ABSTRACT

The $CO_2$—$CH_4$ reforming-methanation chemical cycle provides an attractive means of transporting energy, such as solar energy, from the place of generation to the place of use. $CO_2/CH_4$ molar ratios of 2.0–7.0 permit the use of low-temperature pipelines, while lowering the carbon removal temperature of the system. Catalyst specificity is required to provide high methanation reaction temperature without carbon deposition.

6 Claims, 3 Drawing Figures

THERMOCHEMICAL ENERGY TRANSPORT PROCESS

BACKGROUND OF THE INVENTION

This invention is concerned with thermochemical-energy transport processes and, more particularly, with the $CO_2$—$CH_4$ reforming-mathanation chemical cycle of transporting energy, such as solar energy, to a place of use from a place of generation.

Thermochemical energy transport loops can provide an effective means of transportation energy. Such closed cycle loops, using chemical fluids which undergo reversible heat-absorbing and -liberating reactions are key elements in energy transport systems, whether solar, nuclear, or other energy sources are being harnessed. The invention herein disclosed has been developed in conjunction with a complete system of harnessing solar energy gathered from scattered solar collectors and transported to a central energy-storage station from which on-demand power is generated as needed; however, it is emphasized that the process described is amenable for transporting energy from virtually any source to an energy use area, and the scope of the invention should be so understood.

This invention is particularly concerned with modifications and improvements in the $CO_2$ reforming-methanation chemical cycle, $CO_2+CH_4 \rightleftharpoons 2CO+2H_2$. Such a reaction cycle I have found to be particularly well-suited to the collection and transport of solar energy, such as exhibited by the teachings of my earlier U.S. Pat. No. 3,972,183. The $CO_2$ reforming-methanation cycle has been studied before, particularly by Wentorf, U.S. Pat. No. 3,958,625, as a possible alternative to the steam reforming-methanation cycle, $H_2O+CH_4 \rightleftharpoons CO+3H_2$ in conjunction with a nuclear energy transport loop. However, this process has several serious flaws; for example, the chemical conduits connected to the energy source must be operated at relatively high temperatures to prevent steam condensation in the lines. Such a process also necessitates the use of costly liquid-gas separators, as well as various steam addition and condensation steps. Further, the transport fluid used in Wentorf has a higher carbon removal temperature, necessitating the transport fluid to operate at higher temperatures than would be preferred.

SUMMARY OF THE INVENTION

It is an object of the present invention to provide an attractive, economical means of transporting energy from a place of generation to a place of use.

A further object of the invention is to provide a closed loop chemical process in which the reversible reaction $$CO_2+CH_4 \rightleftharpoons 2CO+2H_2$$

is used to transport energy from collection sites to a place of storage and eventual use.

Still another object of the invention is to design an energy transport thermochemical process using non-toxic fluids, employing a working fluid which is devoid of condensables at 20° C. and is free from carbon formation under standard operating conditions.

Activated by energy from a heat source, such as a group of solar receivers, methane is reacted with an excess mixture of $CO_2$ (mole ratios ranging from 2.0–7.0) as well as an excess of CO (CO to $CH_4$ mole ratios of 0.0–0.4), at temperatures ranging from 700°–900° C. in the presence of a suitable catalyst to form a mixture of CO and $H_2$, together with excess $CO_2$, in the endothermic reforming reaction. The reformed gas is cooled to about 80° C. in a countercurrent heat exchanger with incoming cold $CH_4$ and $CO_2$, and pumped under substantially isobaric conditions to the place of energy use. Upon arrival the reformed gas mixture is heated in a delivery heat exchanger to about 350°–550° C., in the presence of a suitable catalyst. CO and $H_2$ react exothermically and form $CH_4$ and $CO_2$ reaction products, the heat that is liberated being used to create process heat for later conversion to electricity or other uses. The methanated fluid is cooled to 100° C. in the heat chamber. Later additionally cooled to 20° C. in a line clamp heat exchanger, and pumped to the receiver heat exchanger, where a repetition of the process above described is continued.

DESCRIPTION OF THE INVENTION

A thermochemical process of transporting energy requires a working fluid which will undergo a reversible, catalytically controlled reaction at high temperatures. One such fluid is a gas mixture of $CO_2$ and $CH_4$. At temperatures above 700° C., the gas mixture favors the reforming reaction which produces CO and $H_2$; while at temperatures of 600° C. and lower, CO and $H_2$, in the presence of a suitable catalyst, favor the methanation reaction and react to produce $CO_2$ and $CH_4$.

Any discussion of the chemistry of the carbon oxides and hydrogen must consider the equilibrium and thermodynamic limitations of the system. In this chemical system, the partial equilibrium pressures of the component gases are determined by the standard equilibrium equations as applied to the reforming-methanation and the shift reactions. For the reaction $CO_2+CH_4 \rightleftharpoons 2CO+2H_2$, it is $$K_p = \frac{p(CO)^2 \cdot p(H_2)^2}{p(CO_2) \cdot p(CH_4)}$$

and for the reaction $H_2O+CO \rightleftharpoons CO_2+H_2$ $$K_1 = \frac{p(CO_2) \cdot p(H_2)}{p(H_2O) \cdot p(CO)}$$

The precise values for $K_p$ and $K_1$ have been calculated as a function of temperature, and as they are known, the equilibrium values of $p(H_2)$, $p(H_2O)$, $p(CO)$, $p(CO_2)$ and $p(CH_4)$ can also be calculated provided the total pressure of the system is known, which is equal to the sum of the partial gas pressures; the C/H atom ratio of the feedstock, 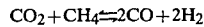 $R_c$;

$$R_c = \frac{p(CH_4) + p(CO) + p(CO_2)}{2p(H_2) + 2p(H_2)) + 4p(CH_4)}$$

as well as the O/H atom ratio of the feedstock $R_o$;

$$R_o = \frac{p(H_2O) + p(CO) + 2p(CO_2)}{2p(H_2) + 2p(H_2O) + 4p(CH_4)}$$

Figure 1:
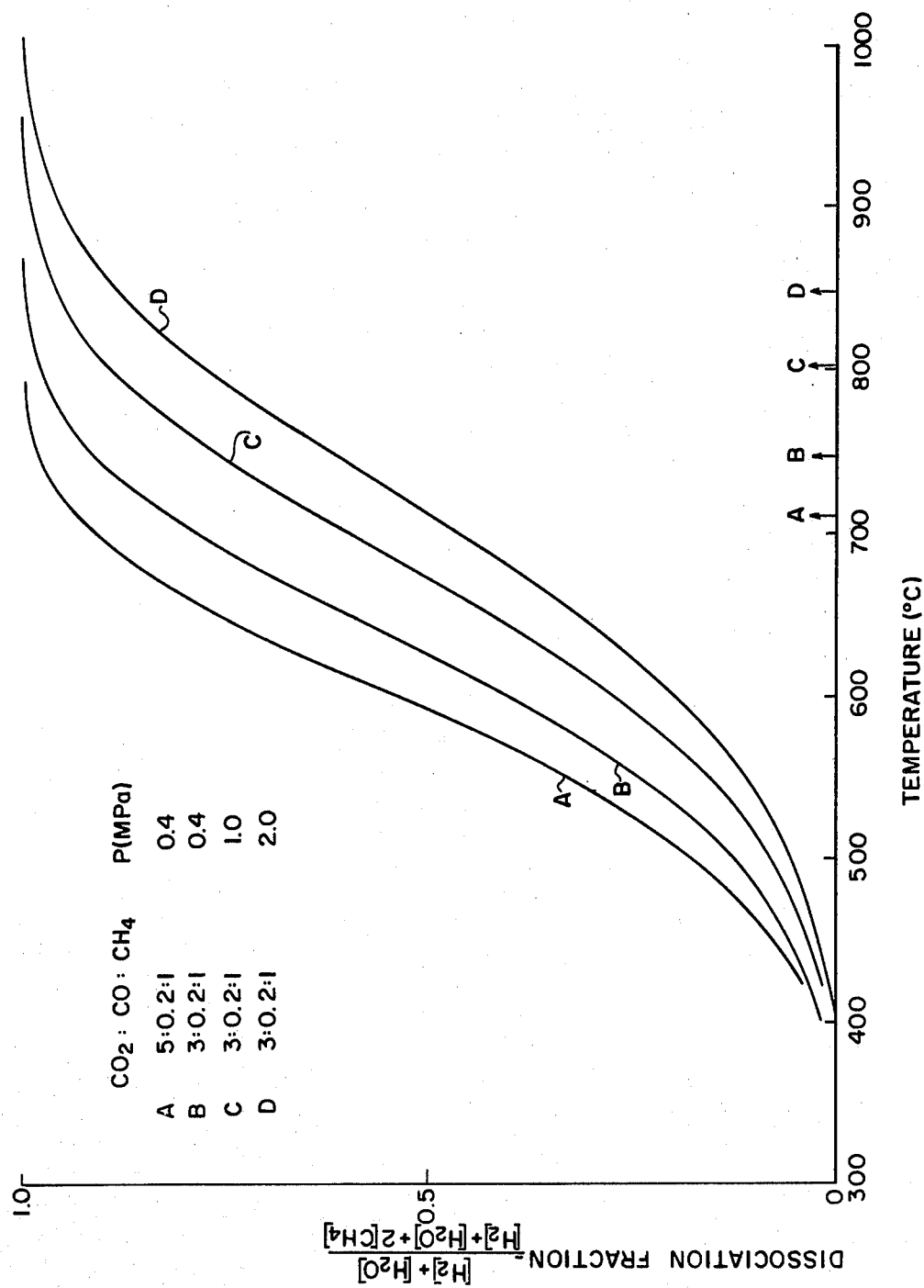
FIG. 1 is an illustration of the equilibrium dissociation fraction for two possible $CO_2$—$CH_4$ feedstocks as a function of temperature.

In FIG. 1 the equilibrium dissociation fraction for two possible $CO_2$—$CH_4$ feedstocks has been plotted as a function of temperature. The figure further discloses that an increase in pressure provides a corresponding increase in the temperature at which $CH_4$ is 50% dissociated and that an increase in $CO_2$ concentration provides an increase in $CH_4$ dissociation for a particular given temperature and pressure.

In addition to the gaseous equilibrium considerations, there may exist an equilibrium between the gaseous mixture and solid carbon. Below a single temperature, known as the "carbon-removal temperature", carbon is thermodynamically stable and forms deposits, while above it carbon deposits are unstable and disappear. Carbon deposition can cause severe problems, including reduced catalyst performance, to the system. In FIG. 1 points A, B, C and D indicate the increasing carbon-removal temperature for each mixture at the indicated system pressure. For a gas mixture with a molar composition corresponding to 3 $CO_2$:O:2CO:1$CH_4$, the carbon removal temperature is 747° C. at 4 atmospheres pressure.

Figure 2:
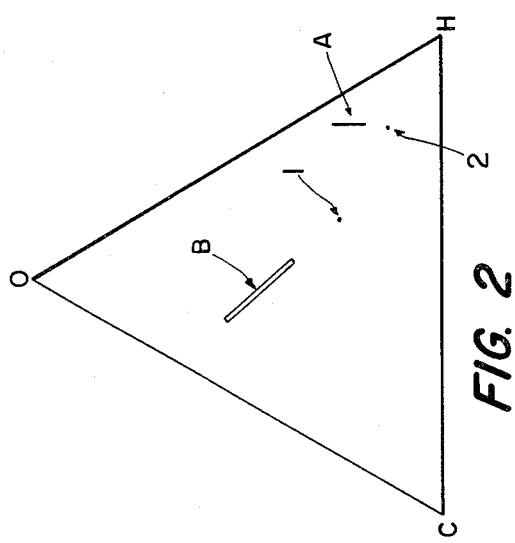
FIG. 2 is a triangular partition diagram showing the atomic fractions of carbon, oxygen, and hydrogen, used by this process as well as the prior art.

FIG. 2 is a triangular diagram illustrating C-H-O atom fractions. One way of classifying thermochemical working fluids involving carbon dioxide, methane and steam is to characterize the fluids by their carbon, hydrogen, and oxygen atomic fractions. The atomic fractions do not change during methanation or reforming chemical reactions, and they are unaffected by the shift reaction.

In FIG. 2 several compositions, corresponding to prior art mixtures, have been plotted. In the diagram, point 1 corresponds to a fully methanated mix of 1 pt $CO_2$ to 1 pt $CH_4$, as used by Wentorf. Point 2 corresponds to a fully methanated mix of 1 pt $H_2O$ to 1 pt $CO_2$. Line segment A corresponds to steam-rich mixes as used in the steam methane reforming-methanation cycle described in several of applicants' earlier writings. Such a mixture is also used in the German Eva Adam process, which is also characterized by water removal before gas transport and water addition prior to the methanation chemical reaction. The region "B" comprises the range of atomic fractions used in this invention.

Certain areas of the triangular atomic partition diagram also correspond to particular problems which arise in the energy transport process. Relevant to pure gas phase energy transmission, the problem with compositions near point 1 is the excessively high carbon removal temperature encountered. The problem with region 2 is the high temperature that must be used in the gas lines to prevent steam condensation. Region B alleviates these problems and therefore has unique value in the energy transport process.

Figure 3:
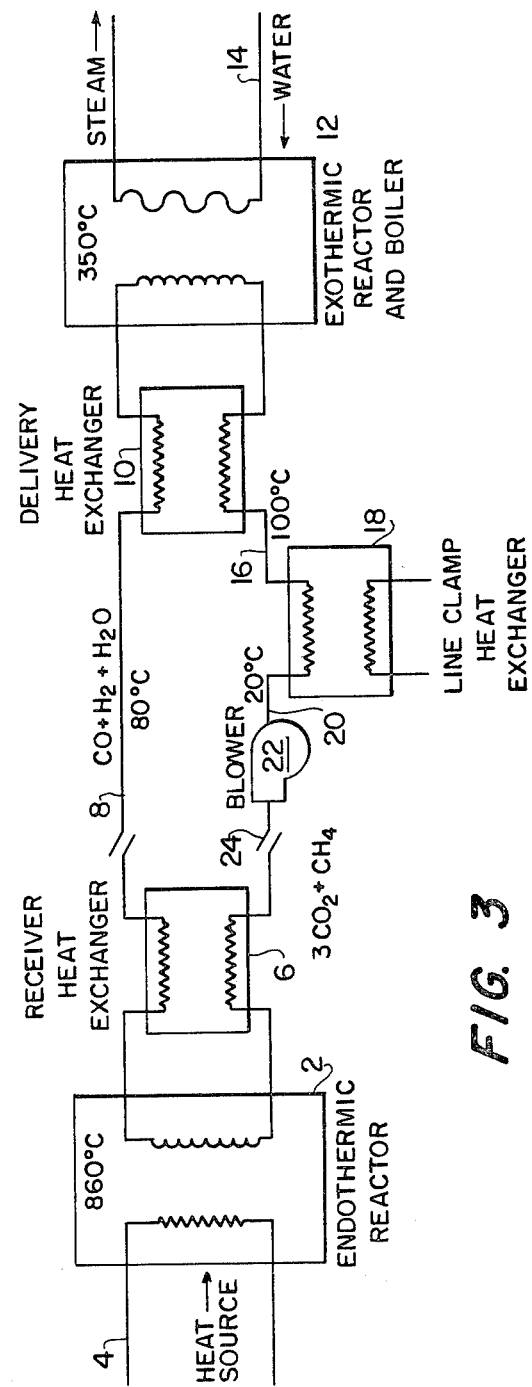
FIG. 3 is a flow diagram illustration the preferred reforming methanation $CO_2$—$CH_4$ energy transport cycle used in the invention.

In FIG. 3, the preferred process flow chart for the transport system is illustrated. Heat supply, or endothermic reactor 2 is located adjacent a high temperature source 4 such as the heat supplied from a group of solar cavity type thermochemical receivers each of which operates as an energy trap and chemically processes all the energy, i.e., sunlight, captured. This trapped solar energy is conducted through the cylindrical walls of the solar receiver onto surfaces interfacing with the gas stream of the working fluid and transported to the reactor. This energy from source 4 heats reactor 2 to about 700°–900° C., preferably about 800° C. In optimizing the gas feed for $CO_2$ reforming, it is important not to use a mixture which results in a system having too high a carbon removal temperature. The following compositions with their corresponding atom fractions, as set forth in Table I, have been studied.

TABLE I

| Molecular Feedstocks | | Atom Fraction | | |
|---|---|---|---|---|
| | | H | C | O |
| $CO_2$ + $CH_4$ | Point 1 | 0.5 | 0.25 | 0.25 |
| $H_2O$ + $CH_4$ | Point 2 | 0.75 | 0.125 | 0.125 |
| 2$H_2O$ + $CH_4$ | | 0.727 | 0.91 | 0.182 |
| | Region B | | | |
| 5$H_2O$ + $CH_4$ | | 0.700 | 0.50 | 0.250 |
| 2$CO_2$ + $CH_4$ | | 0.364 | 0.273 | 0.364 |
| 7$CO_2$ + $CH_4$ | | 0.154 | 0.308 | 0.538 |
| | Region C | | | |
| 2$CO_2$ + $CH_4$ + 0.4 CO | | 0.339 | 0.288 | 0.373 |
| 7$CO_2$ + $CH_4$ + 0.4 CO | | 0.149 | 0.313 | 0.537 |

A suitable catalyst, preferably nickel on a porous alumina substrate, accelerates the gas-reforming reaction. A critical element of the process is the utilization of an excess amount of $CO_2$ in the gas mixture. This excess $CO_2$, ranging from 2 to 7 moles per mole of $CH_4$, would initially appear to be detrimental, since it increases the amount of gas in the system, and hence adds to the pumping requirements. However, this flow is more than offset by the following advantage; it overcomes the side-reaction problem which complicates the chemistry of $CO_2$+$CH_4$ by producing carbon. When the reaction occurs at a sufficiently high temperature, $CO_2$ reacts with the carbon:

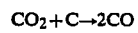

$CO_2+C\rightarrow 2CO$

For every gas mixture and pressure there exists a corresponding carbon-removal temperature. Using an excess amount of $CO_2$ in the mixture has been found to significantly raise the carbon removal temperature of the system. Thus, using an excess of $CO_2$ permits the system to be operated without the introduction of steam, as well as, providing the ability to maintain the chemical lines at a relatively low temperature without harmful steam condensation.

Returning our view to FIG. 3, the reformed gas reaction products as modified by the simultaneously occurring shift reaction, namely CO, $H_2$ and subatmospheric pressure steam, together with excess $CO_2$ and unreacted $CH_4$ exit reactor 2 and are cooled in countercurrent receiver heat exchanger 6 by the cold incoming methanated fluid, to a temperature of about 80° C. The reformed gas travels through pipeline 8, which is constructed preferably from a tough, durable, economic plastic. Line 8 is kept at substantially constant, low pressures (1–10 atms, with about 4 atmospheres the preferred). Higher-pressure operation is also possible if higher-temperature transport lines are employed. Upon reaching the energy-use area, the fluid enters delivery heat exchanger 10 where it is heated by the countercurrent contact with the hot, methanated, reacted gas mixture now exiting reactor 12. The reformed gas mixture exits the heat exchanger at a temperature of about 350° C., whereupon it enters exothermic reactor 12. It is important to choose a suitable catalyst for the methanation reaction. Such a catalyst can aid in preventing carbon build-up and avoid an excessive temperature build up in the reactor. Nickel, nickel-on-alumina, ruthenium, tungsten, tungsten sulfide and molybdenum sulfide have all exhibited favorable methanation promoting qualities. Since high reactivity is not a requirement in this process there is substantial flexibility in choice of catalyst. In general, it is believed that catalytic methanation is achievable without excess carbon formation below about 550° using a 0.5 $H_2$:1CO feedstock. Steam addition would not be required for methanation at temperatures below 600° C., which is out of the expected operating range of reactor temperatures.

The reaction of $CO + H_2$ to produce $CH_4$ and $CO_2$ in reactor 12 is an exothermic reaction, and the heat release is removed by a separate fluid stream 14, in a heat-exchanging relationship with the reacting gases in the reactor. This heated fluid stream, 14, preferably steam, carries the heat away to be used in whatever manner is desired, such as the production of electricity.

The methanated gas mixture exiting the reactor 12 is passed through delivery heat exchanger 10 for cooling, while simultaneously heating the incoming reformed gas mixture. The methanated gas mixture, which now primarily consists of $CH_4$ and $CO_2$, exits heat exchanger 10 at about 100° C. into plastic line 16. The fluid is further cooled to 20° C. by line clamp heat exchanger 18 in which heat is exchanged with air or cold water, and continues in line 20 to blower 22, which supplies the needed small pressure driving force to circulate the gaseous mixture. The methanated fluid enters plastic line 24 until being heated by entering receiver heat exchanger 6 in a similar manner as was done at the methanator end, where upon the process is repeated indefinitely.

There are several significant advantages in using this process over that of the prior art, some of which have already been enumerated. This process operates substantially isobarically at a low pressure using only a small pressure increment to maintain proper circulation. There are no steam addition or condensation steps, thus allowing the system to operate without such expensive equipment as a liquid gas separator. The gas conduits are kept at low temperatures and can be made from economical plastic. Finally, the fluid used has a comparatively low carbon removal temperature.

Obviously many modifications and variations of the present invention are possible in light of the above teachings. It is therefore to be understood that within the scope of the appended claims the invention may be practiced otherwise than as specifically described.

I claim:
1. A method of transporting thermal energy from a source of heat to a place of use comprising:
reacting, at a temperature of at least 700° C., a gas mixture of CO, $CO_2$ and $CH_4$, having a $CO_2/CH_4$ mole ratio of 2.0–7.0 and a $CO/CH_4$ mole ratio of 0.0–0.4, in the presence of a first catalyst to produce a reformed gas mixture of primarily $CO_2$, $H_2$, CO and $H_2O$;
transporting said gas mixture to said plate of use;
reacting, at a temperature of about 600° C. or less, said reformed gas mixture in the presence of a second catalyst to produce a substantially methanated gas mixture and thermal energy;
cooling and pressurizing said methanated gas mixture;
transporting said methanated gas mixture to said source of heat; and
repeating the series of steps set forth above.
2. A method of transporting thermal energy from a source of heat to a place of use comprising:
reacting, at a temperature from about 700° C. to about 900° C., gas mixture of CO, $CO_2$ and $CH_4$ with a $CO_2/CH_4$ mole ratio of 2.0–7.0 and a $CO/CH_4$ mole ratio of 0.0–0.4 in the presence of a first catalyst to produce a reformed gas mixture of primarily $CO_2$, $H_2$, CO and $H_2O$;
cooling said reformed gas mixture;
transporting said reformed gas mixture to said place of use;
reacting, at a temperature from about 350° C. to about 550° C., said reformed gas in the presence of a catalyst to yield thermal energy and a substantially methanated gas mixture of $CH_4$ and $CO_2$;
cooling said methanated gas mixture;
transporting said methanated gas mixture to said source of heat;
heating said gas mixture to a temperature from about 700° to about 900° C.;
repeating the series of steps set forth above.
3. A method as claimed in claim 2 wherein said $CO_2/CH_4$ mole ratio is substantially 3:1.
4. A method as claimed in claim 2 wherein said first catalyst is nickel.
5. A method as claimed in claim 2 wherein said reformed gas mixture is cooled to a temperature from about 60° C. to about 300° C.
6. A method as claimed in claim 1 where said second catalyst is selected from the group consisting of nickel, nickel-on-alumina, ruthenium, tungsten, tungsten sulfide and molybdenum sulfide.

* * * * *